(12) United States Patent
Takagi et al.

(10) Patent No.: US 11,017,928 B2
(45) Date of Patent: May 25, 2021

(54) MAGNET, MAGNET STACK, AND MOTOR

(71) Applicant: TDK Corporation, Tokyo (JP)

(72) Inventors: Nobuo Takagi, Tokyo (JP); Motohisa Murata, Tokyo (JP); Koji Mitake, Tokyo (JP)

(73) Assignee: TDK CORPORATION, Tokyo (JP)

( * ) Notice: Subject to any disclaimer, the term of this patent is extended or adjusted under 35 U.S.C. 154(b) by 507 days.

(21) Appl. No.: 15/696,366

(22) Filed: Sep. 6, 2017

(65) Prior Publication Data

US 2018/0068772 A1 Mar. 8, 2018

(30) Foreign Application Priority Data

Sep. 8, 2016 (JP) .............................. JP2016-175677

(51) Int. Cl.
*H01F 7/02* (2006.01)
*H02K 1/27* (2006.01)

(52) U.S. Cl.
CPC ............. *H01F 7/021* (2013.01); *H02K 1/274* (2013.01); *H02K 1/2766* (2013.01)

(58) Field of Classification Search
CPC .. H02K 1/00; H02K 1/06; H02K 1/17; H02K 1/274; H02K 1/2746; H02K 1/2753; H02K 1/276; H01F 7/00; H01F 7/02; H01F 7/0221; H01F 7/0273; H01F 7/0247
USPC ........ 310/12.24, 12.25, 152, 154.01, 154.03, 310/154.06, 154.07, 154.21, 154.24, 310/154.43, 156.01, 156.18, 156.21, 310/156.38, 156.72; 335/153, 84, 91, 92, 335/296, 302, 303, 30
See application file for complete search history.

(56) References Cited

U.S. PATENT DOCUMENTS

| | | | | |
|---|---|---|---|---|
| 2011/0012460 | A1* | 1/2011 | Ozeki | H01F 1/0577 310/152 |
| 2015/0099104 | A1* | 4/2015 | Liang | B22F 3/12 428/220 |
| 2016/0059518 | A1 | 3/2016 | Fukunaga et al. | |
| 2017/0092398 | A1* | 3/2017 | Li | H01F 7/021 |
| 2017/0092399 | A1* | 3/2017 | Li | H01F 7/021 |

FOREIGN PATENT DOCUMENTS

| | | |
|---|---|---|
| CN | 101978577 A | 2/2011 |
| CN | 204947841 U | 1/2016 |
| JP | 2000-324736 A | 11/2000 |
| JP | 2009-142091 A | 6/2009 |
| JP | 2009-225608 A | 10/2009 |
| JP | 2010-259231 A | 11/2010 |
| JP | 2013-243886 A | 12/2013 |
| JP | 2016-052147 A | 4/2016 |

* cited by examiner

*Primary Examiner* — Nguyen Tran
(74) *Attorney, Agent, or Firm* — Faegre Drinker Biddle & Reath LLP

(57) ABSTRACT

In a magnet, an insulating layer is fixed to an upper surface of the magnet provided with the insulating layer, but is not fixed to a lower surface of the magnet above the insulating layer. Therefore, even when the magnet expands or contracts due to a temperature change, stress is less likely to occur at an interface between the insulating layer provided on the upper surface of the magnet and the magnet above the insulating layer.

12 Claims, 18 Drawing Sheets

MAGNET, MAGNET STACK, AND MOTOR

CROSS-REFERENCE TO RELATED APPLICATIONS

This application is based upon and claims the benefit of priority from Japanese Patent Application No. 2016-175677, filed on 8 Sep. 2016, the entire content of which is incorporated herein by reference.

TECHNICAL FIELD

The present disclosure relates to a magnet, a magnet stack and a motor.

BACKGROUND

Conventionally, as a permanent magnet motor used in a hybrid car, a hard disk drive or the like, a magnet embedded type motor (IPM motor) in which a permanent magnet is embedded in a rotor has been known (for example, the following Patent Literature 1). Further, the following Patent Literature 2 discloses a magnet embedded type motor in which a permanent magnet embedded in a rotor is divided into a plurality of small magnets, an insulator is interposed between the small magnets, and a channel of an eddy current between the small magnets is cut off, thereby suppressing a degradation in magnet performance due to an eddy current.

Patent Literature 1: Japanese Unexamined Patent Publication No. 2009-142091

Patent Literature 2: Japanese Unexamined Patent Publication No. 2000-324736

Patent Literature 3: Japanese Unexamined Patent Publication No. 2013-243886

SUMMARY

However, in the above-mentioned related art, sufficient consideration has not been made on how to stack the insulator and the small magnet. For this reason, for example, in a case where the small magnet and the insulator alternately arranged are not fixed to each other, a relative positional displacement occurs between the small magnet and the insulator or the small magnets come into contact with each other. Thus, it is difficult to obtain sufficient magnet characteristics. Meanwhile, when the small magnet and the insulator alternately arranged are fixed to each other, stress occurs between the small magnet and the insulator when the small magnet is expanded or contracted due to temperature change, and cracks, chips or peeling may occur in the small magnet or the insulator. As a result, the magnet characteristics of the motor or the magnet stack may change.

According to the present disclosure, there is provided a magnet, a magnet stack, and a motor in which magnet characteristics are stabilized.

A magnet according to an aspect of the present disclosure has a first surface and a second surface facing each other, and an insulating layer is formed only on the first surface among the first surface and the second surface, and the insulating layer is fixed to the first surface.

It is possible to prepare a plurality of the magnets and stack the magnets in the same attitude in the opposing direction of the first surface and the second surface. At this time, assuming that one magnet is a first magnet and a magnet positioned on the first surface side of the first magnet is a second magnet, the insulating layer is configured to be interposed between the first surface of the first magnet and the second surface of the second magnet. Therefore, the first magnet and the second magnet are insulated, and the channel of the eddy current between the magnets is cut off, thereby suppressing a degradation of the magnet performance due to the eddy current. The insulating layer is in a state of being fixed to the first surface of the first magnet but is only in contact with the second surface of the second magnet and is in a non-fixed state. Therefore, even when the first magnet expands or contracts due to a temperature change, stress is less likely to occur at the interface between the insulating layer of the first magnet and the second magnet, the magnet characteristics are stabilized.

In the magnet according to another aspect, an insulating layer is partially formed on the first surface.

In the magnet according to another aspect, the first surface has a rectangular shape and the insulating layer has a rectangular annular pattern along edges of the first surface.

In the magnet according to another aspect, the insulating layer further has a linear pattern dividing the rectangular annular pattern.

In the magnet according to another aspect, the insulating layer is made up of a plurality of dot patterns.

In the magnet according to another aspect, the first surface has a rectangular shape, and the insulating layer includes four dot patterns disposed at each of four corners of the first surface.

In the magnet according to another aspect, the first surface has a rectangular shape, and the insulating layer includes four dot patterns disposed at each of four corners of the first surface, and two dot patterns disposed at each of midway points between the two dot patterns arranged along the two opposing sides of the first surface among the four patterns.

In the magnet according to another aspect, the insulating layer includes a plurality of linear patterns arranged in parallel.

In the magnet according to another aspect, the linear pattern extends along a magnetization direction of the magnet.

In the magnet according to another aspect, the first surface has a rectangular shape, and the insulating layer has two linear patterns arranged along two opposing sides of the first surface.

In the magnet according to another aspect, the insulating layer further has a linear pattern located at midway point between the two linear patterns.

In the magnet according to another aspect, the insulating layer includes a dot pattern and a linear pattern.

In the magnet according to another aspect, the insulating layer is formed on the entire surface of the first surface.

In the magnet according to another aspect, the insulating layer includes a first portion having a first thickness, and a second portion having a second thickness different from the first thickness.

According to another aspect of the present disclosure, there is provided a magnet stack including a plurality of magnets having a first surface and a second surface facing each other, an insulating layer being formed only on the first surface among the first surface and the second surface, and the insulating layer being fixed to the first surface, wherein a first surface of one magnet and a second surface of the other magnet are stacked to face each other at the same attitude.

In the magnet stack, when one magnet is set as a first magnet and the magnet located on the first surface side of the first magnet is set as a second magnet, an insulating layer is interposed between the first surface of the first magnet and the second surface of the second magnet. Therefore, since the first magnet and the second magnet are insulated, and the channel of the eddy current between the magnets is cut off, degradation of the magnet performance due to the eddy current is suppressed. The insulating layer is in a state of being fixed to the first surface of the first magnet but is only in contact with the second surface of the second magnet and is in a non-fixed state. Therefore, even when the first magnet expands or contracts due to a temperature change, stress is less likely to occur at the interface between the insulating layer of the first magnet and the second magnet, the magnet characteristics are stabilized.

A motor according to an aspect of the present disclosure includes a rotor provided with a slot housing a magnet stack, the magnet stack includes a plurality of magnets having a first surface and a second surface facing each other, an insulating layer being formed only on the first surface among the first surface and the second surface, and the insulating layer being fixed to the first surface, and a first surface of one magnet and a second surface of the other magnet are stacked to face each other at the same attitude.

In the above motor, when one magnet of the magnet stack is set as a first magnet and the magnet located on the first surface side of the first magnet is set as a second magnet, an insulating layer is interposed between the first surface of the first magnet and the second surface of the second magnet. Therefore, since the first magnet and the second magnet are insulated, and the channel of the eddy current between the magnets is cut off, degradation of the magnet performance due to the eddy current is suppressed. Further, the insulating layer is in a state of being fixed to the first surface of the first magnet but is only in contact with the second surface of the second magnet and is in a non-fixed state. Therefore, even when the first magnet expands or contracts due to a temperature change, stress is less likely to occur at the interface between the insulating layer of the first magnet and the second magnet, the magnet characteristics are stabilized.

DETAILED DESCRIPTION

Figure 1:
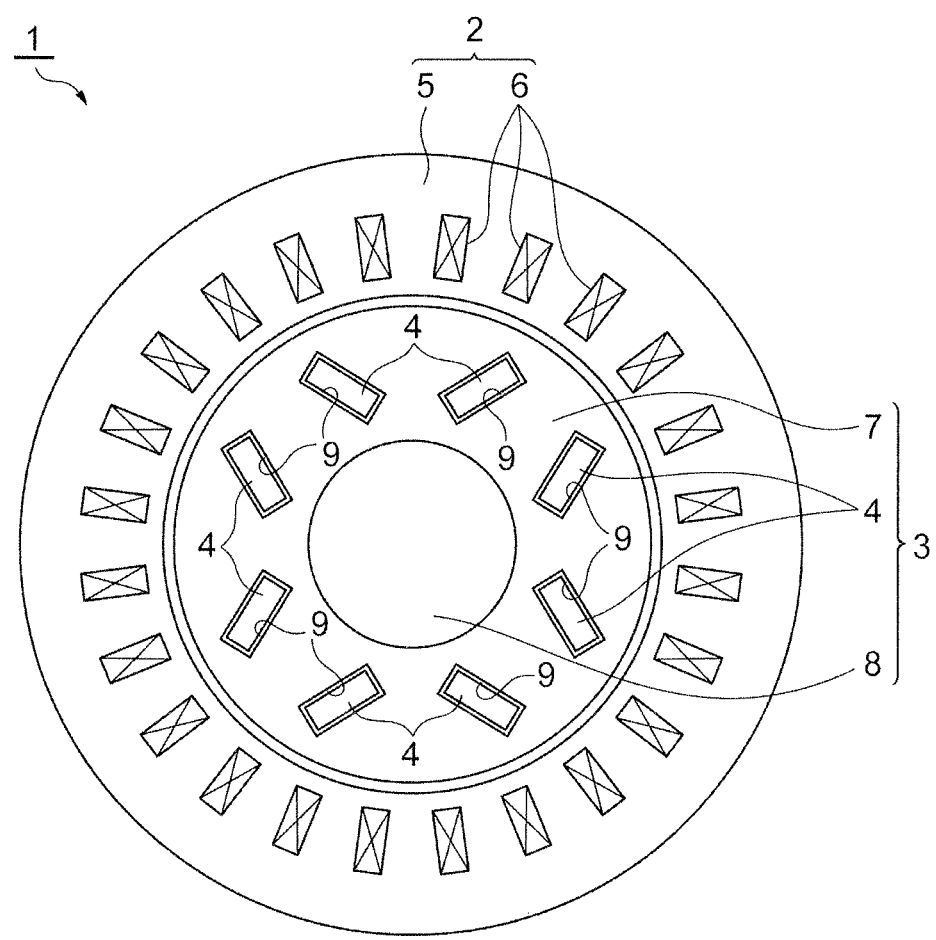
FIG. 1 is a schematic plan view illustrating a motor according to the embodiment.

Hereinafter, a mode for carrying out the present disclosure will be described in detail with reference to the accompanying drawings. The same or equivalent elements are denoted by the same reference numerals, and if the description is repeated, the description thereof will not be provided.

First, a configuration of a motor 1 according to the embodiment will be described with reference to FIG. 1.

As illustrated in FIG. 1, the motor 1 is configured to include a stator 2 and a rotor 3 disposed inside the stator 2 in a freely rotatable manner. The motor 1 is a so-called magnet-embedded type IPM motor in which the magnet stack 4 is embedded in the rotor 3.

The stator 2 includes an iron core 5 and a plurality of windings 6 wound around the iron core 5. Further, a predetermined number of windings 6 are disposed on the inner circumferential surface of the stator 2 at equal intervals, and when the windings 6 are energized, a rotating magnetic field for rotating the rotor 3 is generated.

The rotor 3 includes a core 7, a shaft 8 connected to the core 7, and a magnet stack 4 housed and fixed in a slot 9 provided in the core 7.

Figure 2:
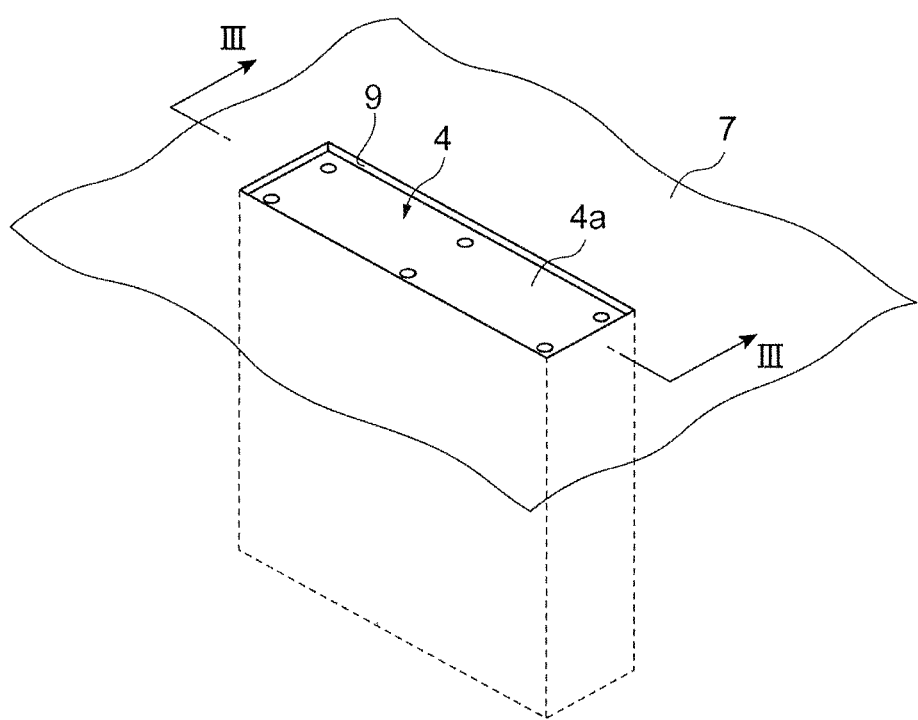
FIG. 2 is an enlarged perspective view illustrating the circumference of a slot in FIG. 1.
Figure 3:
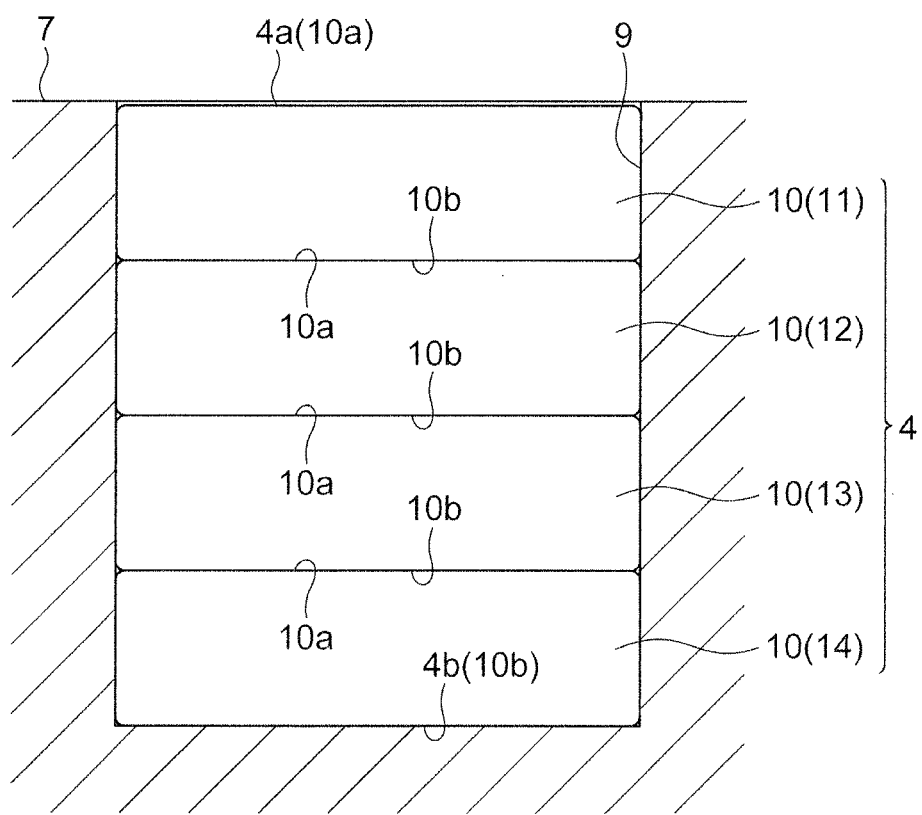
FIG. 3 is a cross-sectional view taken along a line III-III of the slot and magnet stack illustrated in FIG. 2.

The core 7 is made up of a laminate such as a thin plate-like electromagnetic steel plate, a shaft hole is formed in a central portion thereof, and the shaft 8 is fitted to the shaft hole. In the vicinity of the outer circumference of the core 7, a plurality of pairs (four pairs in FIG. 1) of the slots 9 periodically arranged around the axis of the core 7 is provided. Each pair of slots 9 is disposed symmetrically with respect to an imaginary line extending from the axis of the core 7 and is disposed to be inclined with respect to the imaginary line by a predetermined angle. As illustrated in FIGS. 2 and 3, the respective slots 9 are housed in the magnet stack 4.

Figure 4:
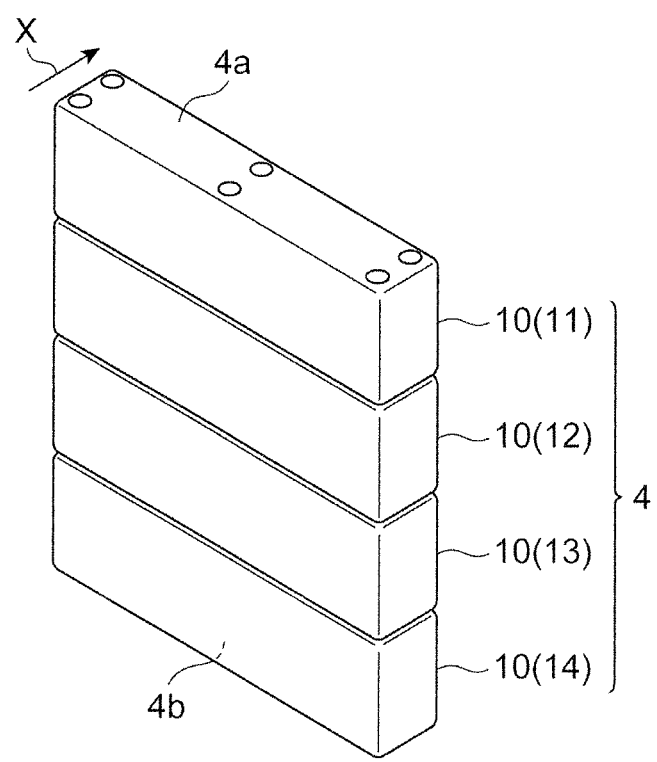
FIG. 4 is a schematic perspective view illustrating the magnet stack according to the embodiment.
Figure 5:
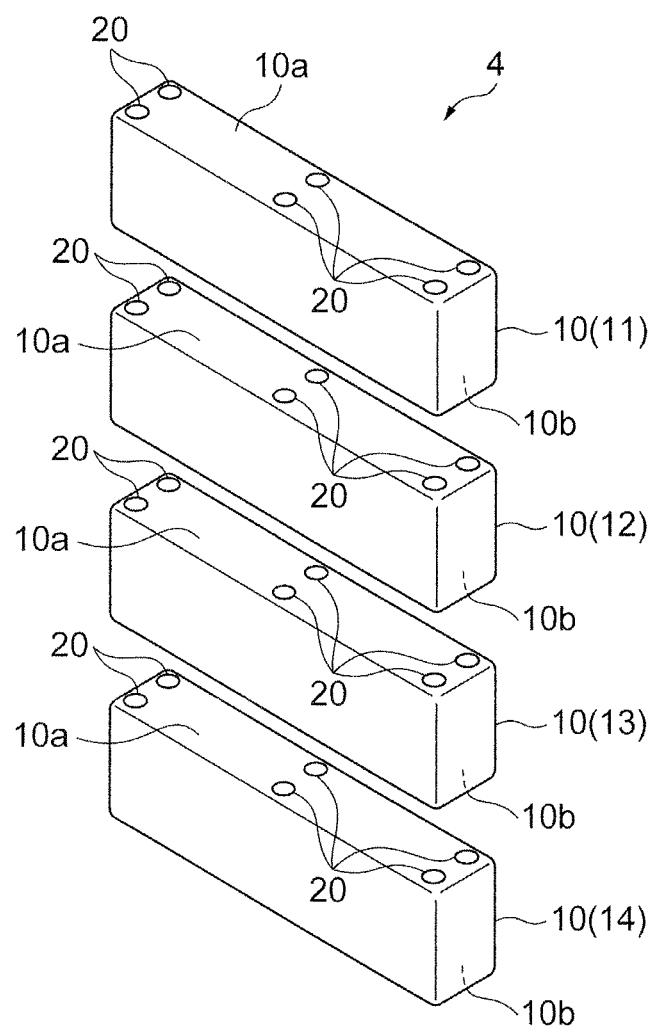
FIG. 5 is an exploded perspective view of the magnet stack illustrated in FIG. 4.

As illustrated in FIGS. 3 to 5, the magnet stack 4 includes four rectangular parallelepiped magnets 10 stacked along the depth direction of the slots 9. The four magnets 10 are permanent magnets made of the same material. The magnet 10 according to the present embodiment is made of a rare earth sintered magnet, for example, an R-T-B based sintered magnet. The R-T-B based sintered magnet includes grains (crystal grains) having an R2T14B-type crystal structure and grain boundaries.

R in the R-T-B based sintered magnet represents at least one kind of rare earth elements. The rare earth elements refer to Sc, Y and lanthanoid element belonging to the third group of the long period type periodic table. Examples of the lanthanoid element include, for example, La, Ce, Pr, Nd, Sm, Eu, Gd, Tb, Dy, Ho, Er, Tm, Yb, Lu and the like. T in the R-T-B based sintered magnet represents Fe, or Fe and Co. Further, T may contain one or more kinds selected from other transition metal elements. B in the R-T-B based sintered magnet represents boron (B), or boron (B) and carbon (C).

The R-T-B based sintered magnet according to the present embodiment may contain Cu, Al, or the like. By adding these elements, it is possible to increase the coercive force, to increase the corrosion resistance, or to improve the temperature characteristics.

Furthermore, the R-T-B based sintered magnet according to the present embodiment may contain Dy, Tb, or both as heavy rare earth elements. The heavy rare earth element may be contained in crystal grains and the grain boundaries. In the case where the heavy rare earth element is substantially not contained in the crystal grains, the heavy rare earth element may be contained in the grain boundaries. The concentration of the heavy rare earth element in the grain boundaries may be higher than the concentration in the crystal grain. The R-T-B based sintered magnet according to the present embodiment may be an R-T-B based sintered magnet in which the grain boundary diffusion of the heavy rare earth elements is performed. In the R-T-B based sintered magnet in which the grain boundary diffusion of the heavy rare earth element is performed, it is possible to improve residual magnetic flux density and coercive force by a smaller amount of heavy rare earth element than the R-T-B based sintered magnet in which the grain boundary diffusion is not performed.

Further, the dimensions of the four magnets 10 are designed to be the same dimension. For example, the long-side length is in the range of 3 to 70 mm, the short-side length is in the range of 3 to 30 mm, and the height is in the range of 3 to 70 mm. As an example, each of the four magnets 10 has a long-side length of 21 mm, a short-side length of 4 mm, and a height of 6.275 mm. If necessary, the magnet 10 may be subjected to a predetermined polishing treatment (e.g., barrel polishing or the like) to be chamfered. In the following description, the four magnets 10 are also referred to as magnets 11 to 14 in order from the top.

The four magnets 10 are stacked in the same posture so that the upper surface (first surface) 10a of a single magnet 10 and the lower surface (second surface) 10b of the other magnet face each other. Specifically, the upper surface 10a of the uppermost magnet 11 is an upper surface 4a of the entire magnet stack 4, and the lower surface 10b of the uppermost magnet 11 faces the upper surface 10a of the magnet 12 just below the uppermost magnet 11. Further, the lower surface 10b of the magnet 12 faces the upper surface 10a of the magnet 13 just below the lower surface 10b. Further, the lower surface 10b of the magnet 13 faces the upper surface 10a of the magnet 14 just below the lower surface 10b. The lower surface 10b of the magnet 14 is the lower surface 4b of the entire magnet stack 4 and is in contact with the bottom surface of the slot 9.

Further, all the four magnets 10 are magnetized in the same direction and are magnetized in a direction parallel to the short-side direction X as illustrated in FIG. 4.

The cavity dimension of the slot 9 is substantially the same as the dimension of the magnet stack 4 or larger than the dimension of the magnet stack 4. However, the depth of the slot 9 is designed to be slightly deeper (for example, deeper by 0.2 mm) than the height of the magnet stack 4 so that the upper surface 4a of the magnet stack 4 is not extracted from the slot 9. Further, a predetermined clearance (e.g., 0.1 mm) is provided between the inner surface of the slot 9 and the side surface of the magnet stack 4.

Further, the slots 9 may be filled with a filler as appropriate so that the magnet stack 4 is fixed to the slots 9. As the filler, thermosetting resin can be used, for example, an epoxy resin or a silicone resin can be used. However, as long as the magnet stack 4 housed in the slot 9 is in a state of being fixed to the slot 9, it is not necessary to use a filler.

As illustrated in FIGS. 4 to 7, an insulating layer 20 is provided on the upper surface 10a of each magnet 10. The insulating layer 20 is made up of six dot patterns in FIGS. 4 to 7. The insulating layer 20 is made up of an insulating resin, and is made up of, for example, an epoxy resin, a polyamideimide resin, a polyamide resin, a polyimide resin, an acrylic resin, or the like.

When the insulating layer 20 is provided on the upper surface 10a of the magnet 10, an uncured resin material is applied to the upper surface 10a by application or printing. Further, the resin material is cured by a known curing treatment. Therefore, the upper surface 10a of the magnet 10 and the insulating layer 20 are fixed to each other. They may be firmly fixed. Further, as a method for applying the uncured resin to the upper surface 10a, a coating method using a jet dispenser or a screen printing method can be adopted. In addition, pat printing or sheet transfer may be used.

The dimensions of the six dot patterns 20 are designed to have the same dimension. For example, the diameter is in the range of 1 to 2 mm and the height is in the range of 5 to 30 µm.

Figure 6:
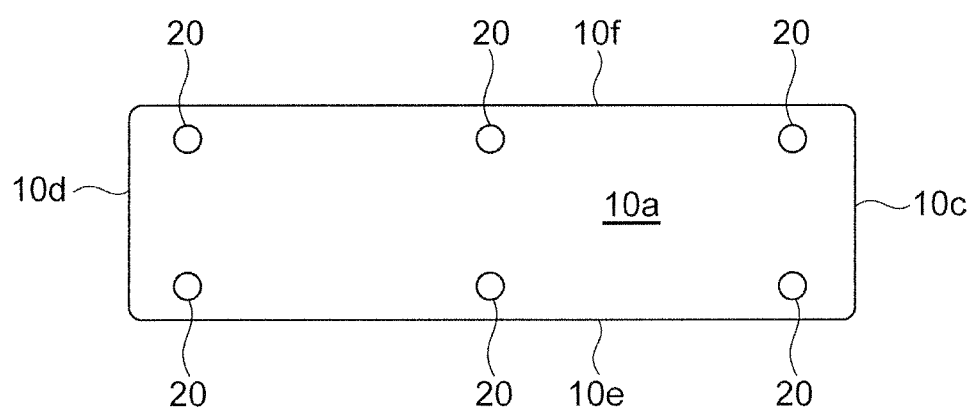
FIG. 6 is a plan view illustrating the magnets illustrated in FIGS. 4 and 5.

As illustrated in FIG. 6, the six dot patterns 20 include four dot patterns disposed at each of four corners defined by short sides 10c and 10d and long sides 10e and 10f on a upper surface 10a having a square shape (specifically, rectangular shape), and two dot patterns disposed at each of the midway points between the two dot patterns disposed along the opposing long sides 10e and 10f. Further, an insulating layer having a predetermined pattern may be formed at positions other than the six dot patterns 20.

After the insulating layer 20 is provided on each of the upper surfaces 10a of the four magnets 10, the four magnets 10 are housed in the slots 9 in a state in which the four magnets 10 are stacked as a magnet stack 4 as illustrated in FIG. 4. Alternatively, the four magnets 10 are sequentially housed in the slot 9 one by one.

Figure 7:
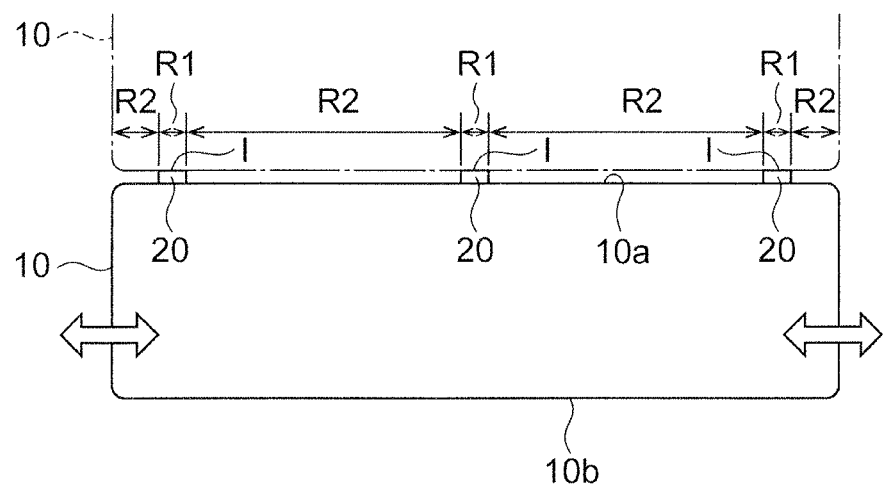
FIG. 7 is a side view illustrating the magnets illustrated in FIGS. 4 and 5.

When another magnet 10 is stacked on the magnet 10 having the six dot patterns 20 provided on the upper surface 10a, as illustrated in FIG. 7, between the upper surface 10a of the lower magnet 10 and the lower surface 10b of the upper magnet 10, a resin region R1 in which the insulating layer 20 made of resin exists and an air region R2 in which air is present without the insulating layer 20 are formed. This is because the insulating layer 20 is not formed over the entire area of the upper surface 10a of the magnet but is formed partially.

Since both of the resin region R1 and the air region R2 have high insulation properties, the above-described magnet stack 4 is insulated between the vertically adjacent magnets 10. By insulation between the magnets 10 in this manner, when an eddy current is generated in the magnet 10 around the magnetization direction X, the channel of eddy current between the vertically adjacent magnets 10 is cut off, and it is possible to suppress a situation in which the eddy current leaks to the vertically adjacent magnets 10. Therefore, in the motor 1 and the magnet stack 4, degradation in magnet performance due to eddy current is suppressed.

In addition, while the insulating layer 20 is in a state of being fixed to the upper surface 10a of the magnet 10 provided with the insulating layer 20, the insulating layer 20 is in a state of not being fixed to the lower surface 10b of the magnet 10 on the upper side of the insulating layer 20. Here, the fixed state is a state of being bound to each other by a mechanical connection represented by an anchor effect or the like, or a chemical interaction represented by a covalent bond or a hydrogen bond, and the unfixed state is a state of not being bound by the mechanical connection or the chemical interaction. As described above, since the insulating layer 20 is cured after applied to the upper surface 10a of the magnet 10 in the state of uncured resin, the insulating layer 20 is fixed to the upper surface 10a of the magnet 10. Meanwhile, since the insulating layer 20 comes into contact with the upper magnet 10 after the resin is cured, the insulating layer 20 is not fixed to the lower surface 10b of the upper magnet 10.

Therefore, even when the magnet 10 expands or contracts due to a temperature change, a stress is less likely to occur at the interface I between the insulating layer 20 provided on the upper surface 10a of the magnet 10 and the magnet 10 on the upper side of the insulating layer 20.

Specifically, as illustrated by a double-headed arrow in FIG. 7, when the magnet 10 expands to extend along the longitudinal direction or contracts to shrink along the longitudinal direction due to a temperature change, the insulating layer 20 fixed to the upper surface 10a of the magnet 10 also displaces along the longitudinal direction in accordance with the expansion and the contraction of the magnet 10. At this time, if the insulating layer 20 is fixed to the lower surface 10b of the upper magnet 10, as the displacement of the insulating layer 20 is restricted, a relatively large stress occurs at the interface I between the insulating layer 20 and the magnet 10 on the upper side thereof. In this case, cracks, chips, and peeling may occur in the upper magnet 10 and the insulating layer 20. As a result, it is conceivable that the magnet characteristics of the motor 1 and the magnet stack 4 change. Further, when a stress occurs at the interface I between the insulating layer 20 and the magnet 10 on the upper side thereof and a large load (e.g., 20 kN or more) is applied to the magnet 10, there is also a failure such as a change in the residual magnetic flux density of the magnet 10.

In particular, in a magnet used for a motor used for a hybrid car or the like, a temperature range over a relatively wide range (e.g., −40° C. to 180° C.) can be assumed. Therefore, it is also sufficiently conceivable that the temperature change of the magnet 10 increases, and it is conceivable that the extent of expansion and contraction of the magnet 10 also considerably increases.

In the present embodiment, the insulating layer 20 is not fixed to the lower surface 10b of the upper magnet 10. Therefore, even when the magnet 10 expands and contracts along the longitudinal direction due to the temperature change, the insulating layer 20 can be displaced to slide against the lower surface 10b of the upper magnet 10, and the stress at the interface I between the insulating layer 20 and the magnet 10 on the upper side thereof is suppressed. As a result, stabilization of the magnet characteristics in the motor 1 or the magnet stack 4 is achieved.

Further, if the insulating layer 20 is not fixed to the upper surface 10a of the magnet 10 provided with the insulating layer 20, the insulating layer 20 may be displaced with respect to the magnet 10. As a result, before or after housed in the slots 9 as the magnet stack 4, the relative positional displacement between the magnets 10 occurs or the vertically adjacent magnets 10 come into contact with each other, which may cause degradation of the magnet characteristics of the motor 1 or the magnet stack 4.

If the insulating layer 20 is provided on both of the upper surface 10a and the lower surface 10b of the magnet 10, two insulating layers are present between the vertically adjacent magnets 10. Thus, the distance between the magnets 10 becomes longer, which causes an enlargement of the outer dimension of the magnet stack 4 or a decrease in the magnet ratio in the magnet stack 4 in order to maintain the outer dimension.

In addition, in the present embodiment, as illustrated in FIG. 7, the air region R2 in which the insulating layer 20 does not exist is formed between the upper surface 10a of the lower magnet 10 and the lower surface 10b of the upper magnet 10.

The dielectric constant (ε=1) of the air existing in the air region R2 is lower than the dielectric constant (ε=3 to 5) of the resin constituting the insulating layer 20 of the resin region R1. Therefore, the air region R2 has higher impedance than the resin region R1. This means that when an eddy current is generated in the magnet 10, eddy current is less likely to leak in the air region R2 compared to the resin region R1. That is, from the viewpoint of suppressing the leakage of the eddy current between the vertically adjacent magnets 10, the air region R2 in which the insulating layer 20 does not exist may be formed between the vertically adjacent magnets 10. Particularly, in order to reduce the dimension and height of the motor and improve the performance of the motor, it is necessary to maximize the volume of the magnet in a limited space inside the motor. Therefore, when the insulating layer 20 is thinned, eddy current is likely to leak via the insulating layer 20. However, even in that case, the leakage of the eddy current is suppressed to some extent by forming the air region R2.

Hereinafter, as a different aspect of the insulating layer 20, patterns other than the aforementioned six dot patterns will be described with reference to FIGS. 8 to 18.

Figure 8:
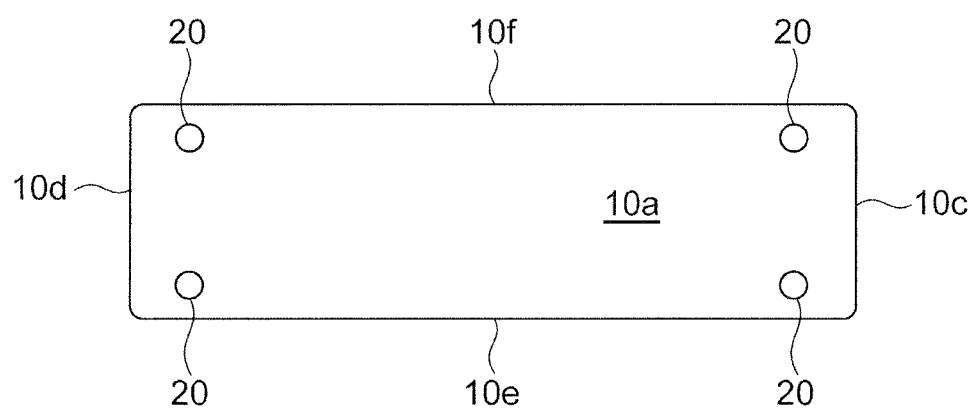
FIG. 8 is a plan view illustrating a magnet of a form different from that of FIG. 6.

In the embodiment illustrated in FIG. 8, four dot patterns 20 are formed as an insulating layer partially formed on the upper surface 10a of the magnet 10. Specifically, the insulating layer includes four dot patterns 20 disposed at each of the four corners defined by the short sides 10c and 10d and the long sides 10e and 10f on the upper surface 10a. Further, an insulating layer having a predetermined pattern may be formed at positions other than the four dot patterns 20.

Even in the case of the four dot patterns as illustrated in FIG. 8, the same operational effect as those of the six dot patterns described above can be obtained.

That is, by providing the four dot patterns 20 as insulating layers, insulation is achieved between the vertically adjacent magnets 10, and the degradation of the magnet performance due to the eddy current is suppressed. Further, although the four dot patterns 20 are fixed to the upper surface 10a of the magnet 10 as in the above-described six dot patterns, they are not fixed to the lower surface 10b of the upper magnet 10. Thus, even when the magnet 10 expands or contracts due to a temperature change, stress is less likely to occur at the interface I between the insulating layer provided on the upper surface 10a of the magnet 10 and the magnet 10 on the upper side of the insulating layer. Furthermore, since the insulating layer is partially formed on the upper surface 10a of the magnet 10, as in the above-described embodiment, the air region R2 having no insulating layer is formed between the upper surface 10a of the lower magnet 10 and the lower surface 10b of the upper magnet 10, and the leakage of the eddy current between the vertically adjacent magnets 10 is suppressed by the air region R2.

Further, the number of the dot patterns 20 as the insulating layer is not limited to four or six, and may increase or decrease as appropriate as long as the number is three or more.

Figure 9:
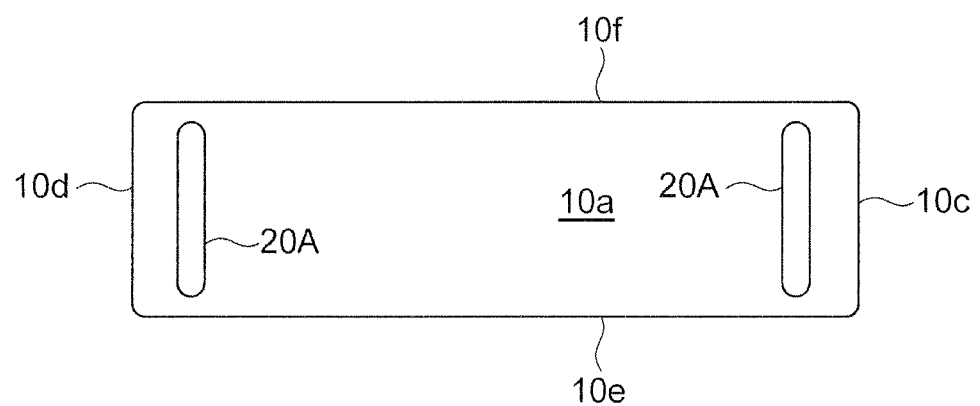
FIG. 9 is a plan view illustrating a magnet of a form different from that of FIG. 6.

In the embodiment illustrated in FIG. 9, two linear patterns 20A arranged in parallel are formed as an insulating layer partially formed on the upper surface 10a of the magnet 10. Specifically, the insulating layer includes two linear patterns 20A extending in the short-side direction over almost the entire length of the short sides 10c and 10d in the vicinity of the short sides 10c and 10d on the upper surface 10a.

Even in the case of the two line-like patterns as illustrated in FIG. 9, the same operational effect as those of the dot pattern described above can be obtained.

That is, by providing the two line-like patterns 20A as the insulating layers, insulation is achieved between the vertically adjacent magnets 10, and degradation of the magnet performance due to the eddy current is suppressed. Further, although the two line-like patterns 20A are fixed to the upper surface 10a of the magnet 10 as in the above-described dot pattern, since the two line-like patterns 20A are not fixed to the lower surface 10b of the upper magnet 10, even when the magnet 10 expands or contracts due to the temperature change, stress is less likely to occur at the interface I between the insulating layer provided on the upper surface 10a of the magnet 10 and the magnet 10 on the upper side of the insulating layer. Furthermore, since the insulating layer is partially formed on the upper surface 10a of the magnet 10, as in the above-described embodiment, the air region R2 having no insulating layer is formed between the upper surface 10a of the lower magnet 10 and the lower surface 10b of the upper magnet 10, and the leakage of the eddy current between the vertically adjacent magnets 10 is suppressed by the air region R2.

Further, in the magnet 10, for example, at 30° C. to 180° C. within the use temperature range, the thermal expansion coefficient in the short-side direction X which is the magnetization direction is a positive value (thermal expansion), whereas the thermal expansion coefficient in the direction orthogonal to the short-side direction X (that is, the long-side direction and the height direction) has a negative value (heat shrinkage). Since the thermal expansion coefficient of the resin material constituting the insulating layer is a positive value (thermal expansion), by providing a line-like pattern extending in a direction in which the magnet 10 thermally expands, even when the magnet 10 expands and contracts due to the temperature change, a large stress is less likely to occur between the insulating layer and the upper surface 10a of the magnet 10 provided with the insulating layer. Therefore, a situation in which cracks, chipping, and peeling occur in the magnet 10 or the insulating layer due to such stress is eliminated, and a change in the magnet characteristics of the motor 1 or the magnet stack 4 is suppressed.

Figure 10:
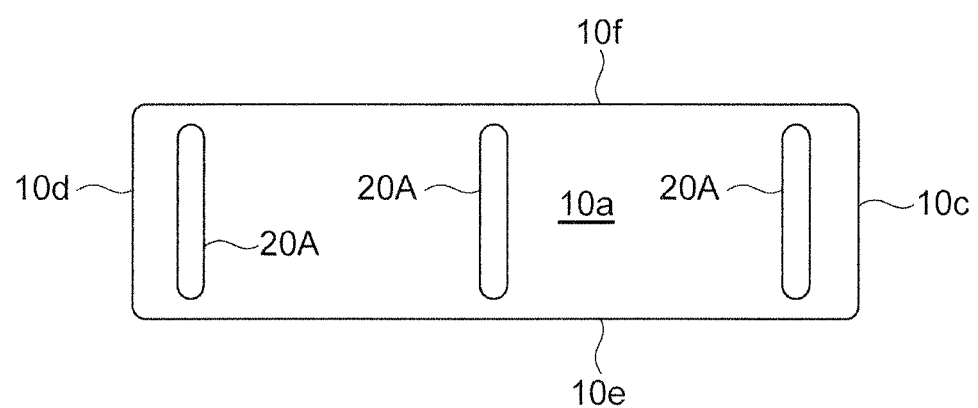
FIG. 10 is a plan view illustrating a magnet of a form different from that of FIG. 6.

In the embodiment illustrated in FIG. 10, three line-like patterns 20A arranged in parallel are formed as an insulating layer partially formed on the upper surface 10a of the magnet 10. Specifically, the insulating layer has, in the vicinity of the short sides 10c and 10d in the upper surface 10a, two line-like patterns 20A extending in the short-side direction over almost the entire length of the short sides 10c and 10d, and the line-like pattern 20A located in the middle of the two line-like patterns.

Even in the case of the three line-like patterns as illustrated in FIG. 10, the same operational effect as those of the aforementioned two line-like patterns can be obtained. The number of the line-like patterns 20A as the insulating layer is not limited to two or three, and may be increased or decreased as appropriate.

Figure 11:
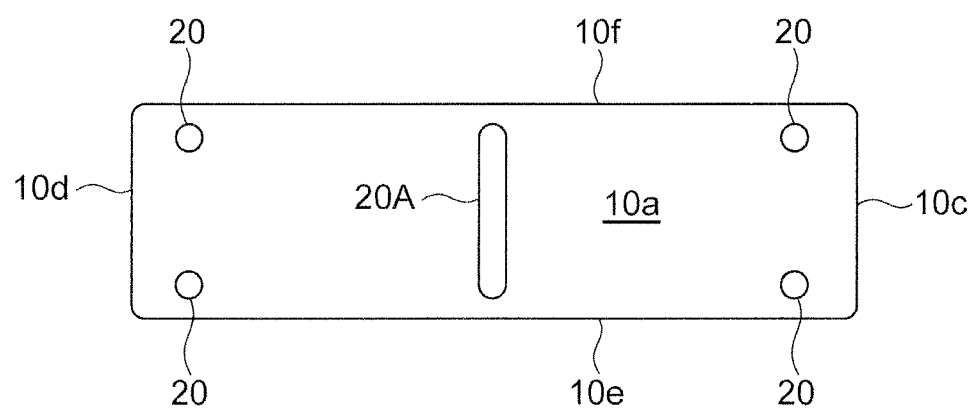
FIG. 11 is a plan view illustrating a magnet of a form different from that of FIG. 6.

In the embodiment illustrated in FIG. 11, four dot patterns 20 and a single line-like pattern 20A are formed as the insulating layer partially formed on the upper surface 10a of the magnet 10. Specifically, the insulating layer has four dot patterns 20 arranged at each of four corners defined by the short sides 10c and 10d and the long sides 10e and 10f on the upper surface 10a, and a single line-like pattern 20A extending in the short-side direction X at the midway points between the long sides 10e and 10f.

A combination of the dot pattern 20 and the line-like pattern 20A as illustrated in FIG. 11 also has the same operational effect as that of only the aforementioned dot pattern 20 and only the line-like pattern 20A.

Figure 12:
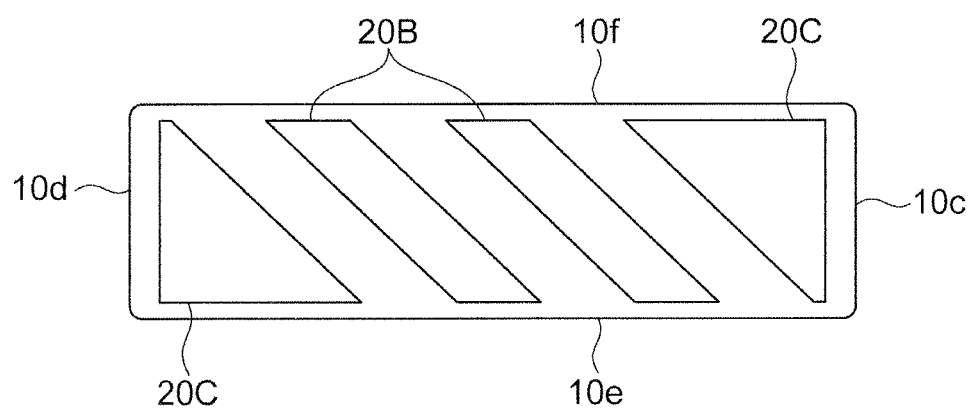
FIG. 12 is a plan view illustrating a magnet of a form different from that of FIG. 6.

In the embodiment illustrated in FIG. 12, two line-like patterns 20B and two triangular patterns C arranged in parallel are formed as the insulating layer partially formed on the upper surface 10a of the magnet 10. Specifically, the insulating layer includes two line-like patterns 20B extending in a direction intersecting with the short-side direction X, and two triangular patterns 20C disposed at each of the two corners defined by the short sides 10c and 10d and the long sides 10e and 10f on the upper surface 10a.

A combination of the line-like pattern 20B and the triangular pattern 20C as illustrated in FIG. 12 also has the same operational effect as the insulating layer pattern of the above-described embodiment.

Figure 13:
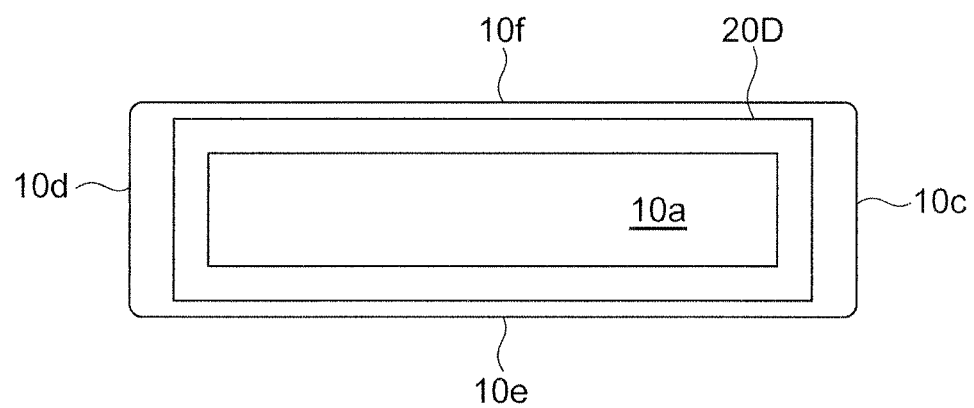
FIG. 13 is a plan view illustrating a magnet of a form different from that of FIG. 6.

In the embodiment illustrated in FIG. 13, an annular pattern 20D is formed as an insulating layer partially formed on the upper surface 10a of the magnet 10. Specifically, the insulating layer includes a rectangular annular pattern 20D extending along the edge of the upper surface 10a.

The annular pattern 20D as illustrated in FIG. 13 also has the same operational effect as the insulating layer pattern of the above-described aspect.

Further, if an annular pattern such as annular pattern 20D is provided as an insulating layer, when the magnets 10 are stacked, the annular pattern is closed by the upper magnet 10, and the closed space is closed by the annular pattern 20D and the upper and lower magnets 10. When the filler is filled in the slot 9 in which the magnet stack 4 is housed, the characteristics of the motor 1 or the magnet stack 4 are influenced depending on the filling degree of the filler. For example, the residual magnetic flux density of the magnet 10 decreases or the torque of the motor 1 decreases due to the stress caused by the filler. Therefore, by providing the annular pattern like the annular pattern 20D as the insulating layer to define the closed space and to prevent the filler from being filled in the closed spaced, it is possible to suppress the change of the above characteristics.

Figure 14:
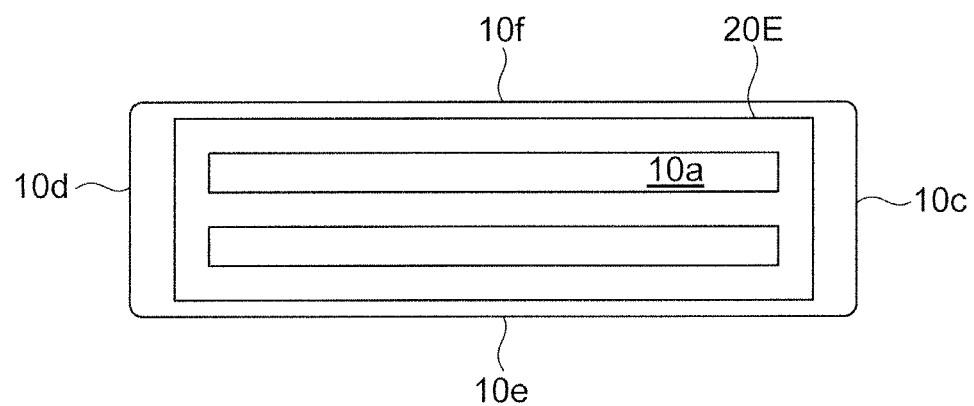
FIG. 14 is a plan view illustrating a magnet of a form different from that of FIG. 6.
Figure 15:
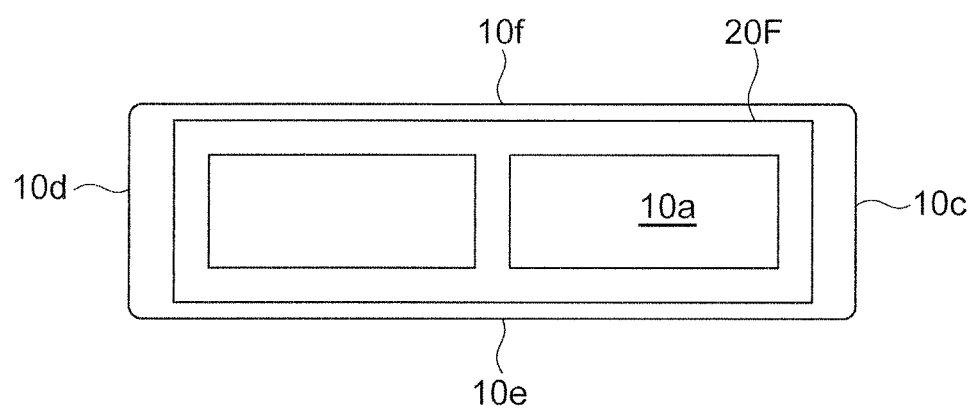
FIG. 15 is a plan view illustrating a magnet of a form different from that of FIG. 6.

In the embodiment illustrated in FIGS. 14 and 15, patterns 20E and 20F are formed as the insulating layers partially formed on the upper surface 10a of the magnet 10. More specifically, FIG. 14 illustrates a pattern 20E which has a rectangular annular pattern along the edge of the upper surface 10a and divides the rectangular annular pattern by a line-like pattern extending along the long-side direction, and FIG. 15 illustrates a pattern 20F which has the rectangular annular pattern extending along the edge of the upper surface 10a and divides the rectangular annular pattern by a line-like pattern extending along the short-side direction.

The patterns 20E and 20F as illustrated in FIGS. 14 and 15 can also obtain the same operational effects as the above-described annular pattern 20D.

Figure 16A:
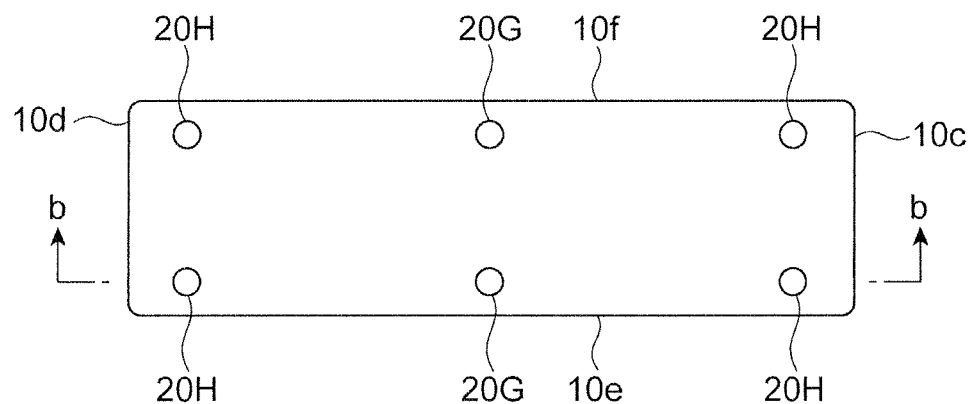
FIG. 16A is a plan view illustrating a magnet of a form different from that of FIG. 6.
Figure 16B:
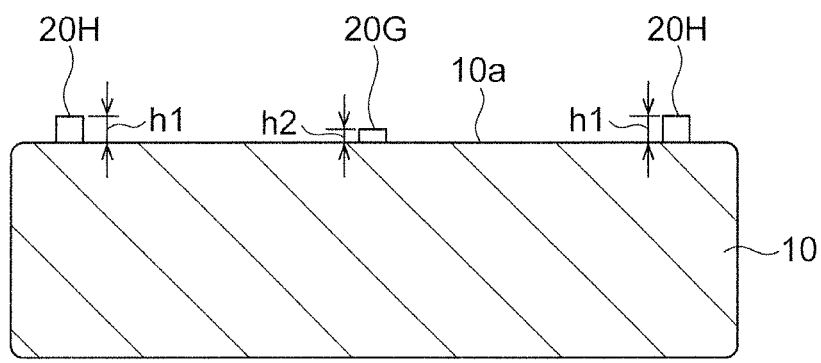
FIG. 16B is a cross-sectional view of the magnet illustrated in FIG. 16A taken along a line b-b.

In the embodiment illustrated in FIGS. 16A and 16B, six dot patterns 20G and 20H are formed as the insulating layer partially formed on the upper surface 10a of the magnet 10. Specifically, the insulating layer has four dot patterns 20H disposed at each of four corners defined by short sides 10c and 10d and long sides 10e and 10f on the upper surface 10a, and two dot patterns 20G disposed at each of the midway points between the two dot patterns 20H aligned along the opposing long sides 10e and 10f.

The height h1 (for example, 30 µm) of the four dot patterns 20H disposed at the four corners of the upper surface 10a is higher than the height h2 (for example, 10 µm) of other two dot patterns 20G (h1>h2).

Even in the dot pattern as illustrated in FIGS. 16A and 16B, the same operational effect as those of the aforementioned dot pattern can be obtained.

In each of the patterns in the above-described embodiment, all the patterns can be designed to have the same height, and it is also possible to design the patterns to have different heights for each pattern as illustrated in FIGS. 16A and 16B.

Figure 17A:
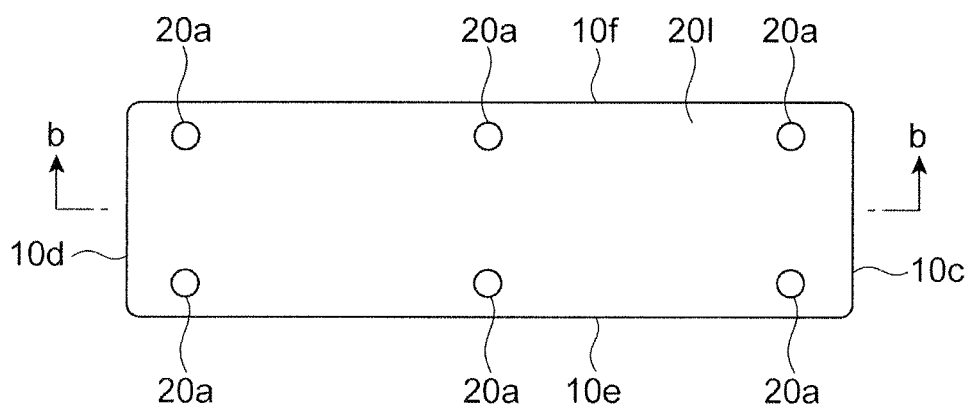
FIG. 17A is a plan view illustrating a magnet of a form different from that of FIG. 6.
Figure 17B:
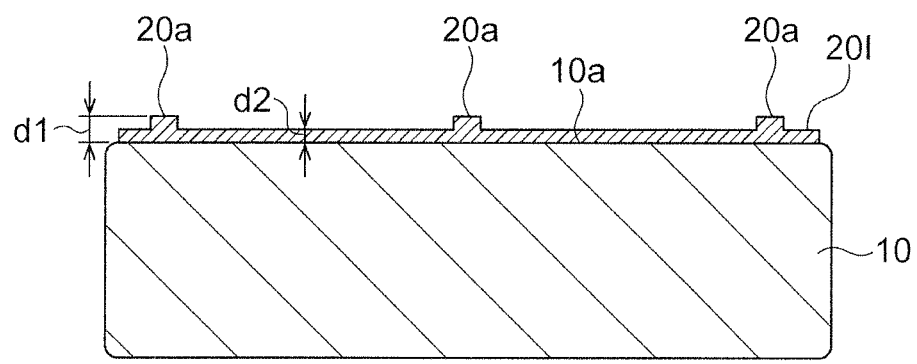
FIG. 17B is a cross-sectional view of the magnet illustrated in FIG. 17A along a line b-b.

In the embodiment illustrated in FIGS. 17A and 17B, a pattern 20I is formed as an insulating layer formed on the entire upper surface 10a of the magnet 10. Specifically, the insulating layer includes an overall coating pattern 20I which has four dot-like protrusions 20a disposed at each of four corners defined by the short sides 10c and 10d and the long sides 10e and 10f on the upper surface 10a, and two dot-like protrusions 20a disposed at each of the midway points between the two dot-like protrusions disposed along the facing long sides 10e and 10f.

In the overall coating pattern 20I illustrated in FIGS. 17A and 17B, the dot-like protrusion (a first portion) 20a has a thickness d1, and a portion (a second portion) other than the dot-like protrusion 20a has a thickness d2 that is smaller than the thickness d1 of the dot-like protrusion 20a.

Even with the overall coating pattern 20I as illustrated in FIGS. 17A and 17B, the same operational effect as the above-described pattern is obtained.

That is, by providing the overall coating pattern 20I as the insulating layer, insulation is achieved between the vertically adjacent magnets 10, and a degradation in the magnet performance due to the eddy current is suppressed. Further, although the overall coating pattern 20I is fixed to the upper surface 10a of the magnet 10 as in the above-described pattern, since the overall coating pattern 20I is not fixed to the lower surface 10b of the upper magnet 10, even when the magnet 10 expands or contracts due to the temperature change, stress is less likely to occur at the interface I between the insulating layer provided on the upper surface 10a of the magnet 10 and the magnet 10 on the upper side of the insulating layer.

Figure 18A:
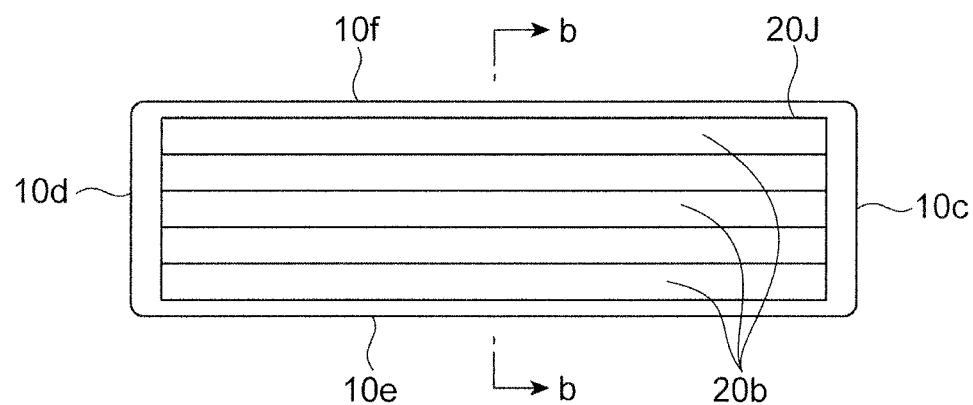
FIG. 18A is a plan view illustrating a magnet of a form different from that of FIG. 6.
Figure 18B:
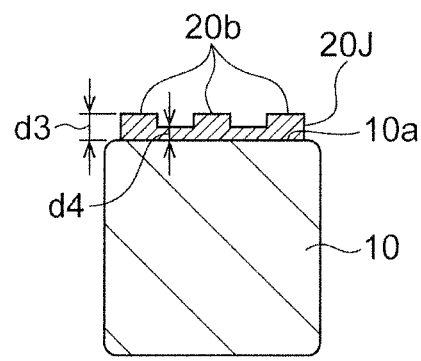
FIG. 18B is a cross-sectional view of the magnet illustrated in FIG. 18A taken along a line b-b.

In the embodiment illustrated in FIGS. 18A and 18B, a pattern 20J is formed as an insulating layer formed on the entire upper surface 10a of the magnet 10. Specifically, the insulating layer includes the overall coating pattern 20J which has three line-like protrusions 20b arranged in parallel at equal intervals along the long sides 10e and 10f on the upper surface 10a.

In the overall coating pattern 20J illustrated in FIGS. 18A and 18B, the line-like protrusion (first portion) 20b has a thickness d3, and a portion (second portion) other than the line-like protrusion 20b has a thickness d4 that is thinner than the thickness d3 of the line-like protrusion 20b.

Even in the case of the overall coating pattern 20J as illustrated in FIGS. 18A and 18B, the same operational effect as the overall coating pattern 20I of FIGS. 17A and 17B is obtained.

Further, the overall coating pattern as illustrated in FIGS. 17A, 17B, 18A, and 18B is not limited to the aspect having partially raised protrusions, but the overall coating pattern may be a flat form having no protrusion.

Further, the present disclosure is not limited to the aforementioned embodiments, and various modifications can be made within the scope that does not depart from the gist of the disclosure.

For example, the number of slots provided in the motor can be appropriately increased or decreased, and the positional relation of the slots can also be appropriately changed.

Also, the number of magnets constituting the magnet stack is not limited to four, but may be two, three, five or more.

What is claimed is:

1. A magnet stack comprising:
a plurality of magnets having a first surface and a second surface facing each other, an insulating layer is partially formed on the first surface, the insulating layer being formed only on the first surface among the first surface and the second surface, the insulating layer being fixed to the first surface, and the insulating layer is made up of a plurality of dot patterns,
wherein a first surface of one magnet and a second surface of the other magnet are stacked to face each other at the same attitude, and
wherein the insulating layer is fixed to the first surface of the one magnet and contacts in an unfixed state with the second surface of the other magnet.

2. The magnet according to claim 1, wherein the first surface has a rectangular shape, and
the insulating layer includes four dot patterns disposed at each of four corners of the first surface.

3. The magnet according to claim 1, wherein the first surface has a rectangular shape, and
the insulating layer includes four dot patterns disposed at each of four corners of the first surface, and two dot patterns disposed at each of midway points between the two dot patterns arranged along the two opposing sides of the first surface among the four patterns.

4. The magnet according to claim 1, wherein the insulating layer includes the plurality of dot patterns and a linear pattern.

5. The magnet according to claim 4, wherein the linear pattern is located at midway point between two dot patterns of the plurality of dot patterns.

6. The magnet stack according to claim 1, wherein at least a first dot pattern of the plurality of dot patterns has a different height of at least a second dot pattern of the plurality dot patterns.

7. The magnet stack according to claim 1, wherein each dot pattern of the plurality of dot patterns has a different height.

8. The magnet stack according to claim 1, wherein the plurality of dot patterns have a same height.

9. A motor comprising a rotor provided with a slot housing a magnet stack,
wherein the magnet stack includes:
a plurality of magnets having a first surface and a second surface facing each other, an insulating layer is partially formed on the first surface, the insulating layer being formed only on the first surface among the first surface and the second surface, the insulating layer being fixed to the first surface, and the insulating layer is made up of a plurality of dot patterns, and
a first surface of one magnet and a second surface of the other magnet are stacked to face each other at the same attitude, wherein the insulating layer is fixed to the first surface of the one magnet and contacts in an unfixed state with the second surface of the other magnet.

10. The motor according to claim 9, wherein at least a first dot pattern of the plurality of dot patterns has a different height of at least a second dot pattern of the plurality dot patterns.

11. The motor according to claim 9, wherein each dot pattern of the plurality of dot patterns has a different height.

12. The motor according to claim 9, wherein the plurality of dot patterns have a same height.

\* \* \* \* \*